(12) United States Patent
Phillips

(10) Patent No.: US 7,891,722 B2
(45) Date of Patent: Feb. 22, 2011

(54) SUNBLOCKING DEVICE

(76) Inventor: Ronald F. Phillips, 2900 Bennett Ave., Des Moines, IA (US) 50310-5517

( * ) Notice: Subject to any disclaimer, the term of this patent is extended or adjusted under 35 U.S.C. 154(b) by 0 days.

(21) Appl. No.: 12/329,085

(22) Filed: Dec. 5, 2008

(65) Prior Publication Data

US 2010/0140971 A1  Jun. 10, 2010

(51) Int. Cl.
    *B60J 3/02* (2006.01)
(52) U.S. Cl. .................... 296/97.6; 296/97.11
(58) Field of Classification Search .............. 296/97.6, 296/97.8, 97.9, 97.11
    See application file for complete search history.

(56) References Cited

U.S. PATENT DOCUMENTS

| | | | | |
|---|---|---|---|---|
| 2,736,374 A | * | 2/1956 | Iverson ..................... 160/220 |
| 2,833,591 A | * | 5/1958 | Kurtzke ..................... 296/97.6 |
| 3,206,244 A | * | 9/1965 | Kurvink ..................... 296/97.6 |
| 3,462,867 A | * | 8/1969 | Pinkman et al. .............. 40/517 |
| 4,526,415 A | * | 7/1985 | Jardine ..................... 296/97.6 |
| 5,165,748 A | * | 11/1992 | O'Connor ................... 296/97.6 |
| 5,259,657 A | * | 11/1993 | Arendt et al. .............. 296/97.6 |
| 5,402,924 A | * | 4/1995 | Gilson ....................... 224/312 |
| 5,873,620 A | * | 2/1999 | Lu ............................ 296/97.5 |
| 6,176,539 B1 | * | 1/2001 | Westerman ................. 296/97.6 |
| 6,412,850 B1 | * | 7/2002 | Francis et al. .............. 296/97.6 |
| 2007/0126256 A1 | * | 6/2007 | Yattavong ................... 296/97.6 |

* cited by examiner

*Primary Examiner*—Jason S Morrow

(57) ABSTRACT

The sunblocking device has an elongated blocking member having a portion that is folded back and attached to the elongated member to form an elongated opening. Extending through the opening is a strap that is preferably elastic that fits around a vehicle visor to secure the device to the visor.

8 Claims, 2 Drawing Sheets

SUNBLOCKING DEVICE

BACKGROUND OF THE INVENTION

This invention is directed to a sunblocking device and more particularly to a sunblocking device that is attached to a vehicle visor.

Vehicle visors are well known in the art and typically are pivotally mounted near the roof of the vehicle. To block the sun the visor is pivoted to a generally vertical position and when not needed is pivoted to a generally horizontal position. While a visor assists in blocking the sun, it also obstructs an individual's field of vision to an extent creating safety issues. Therefore, a need exists in the art for a device that addresses this deficiency.

An objective of the invention is provide a blocking device that blocks the sun while only blocking a minimal field of vision of a driver.

Another objective of the invention is to provide a blocking device that is easy to attach to a conventional visor.

These and other objectives will be apparent to those skilled in the art based on the following description.

SUMMARY OF THE INVENTION

The sunblocking device has an elongated blocking member having a portion that is folded back and attached to the elongated member to form an elongated opening. Extending through the opening is a strap that is preferably elastic that fits around a vehicle visor to secure the device to the visor.

DETAILED DESCRIPTION OF THE PREFERRED EMBODIMENTS

Figure 1:
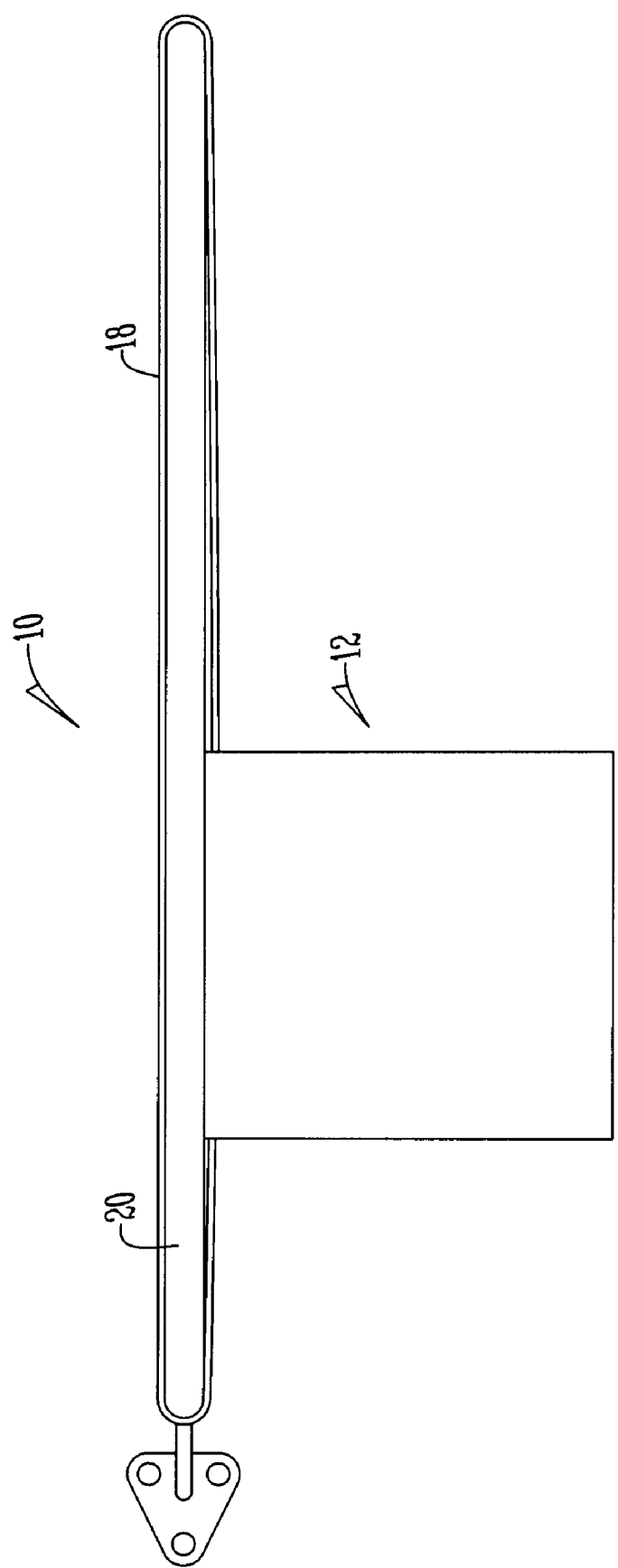
FIG. 1 is a front view of blocking device attached to a vehicle visor.
Figure 2:
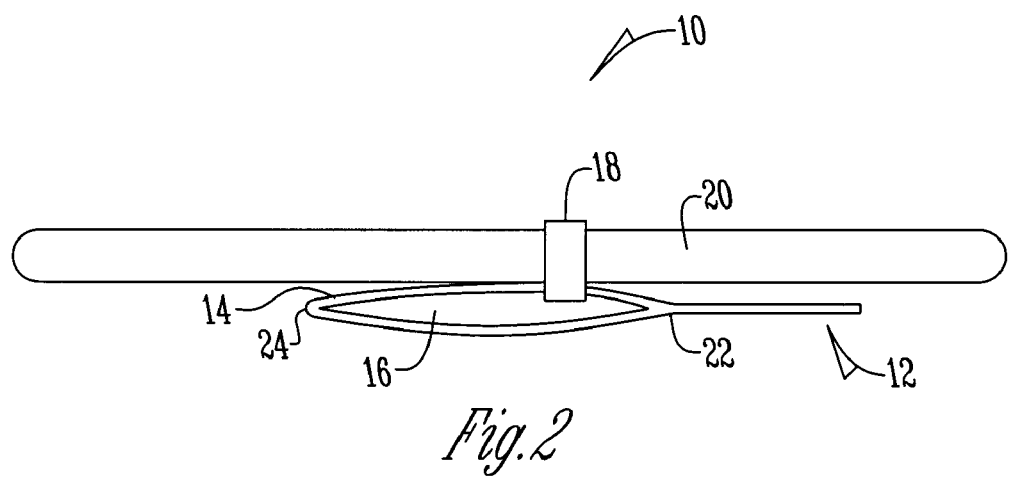
FIG. 2 is a side view of a blocking device attached to a vehicle visor.
Figure 3:
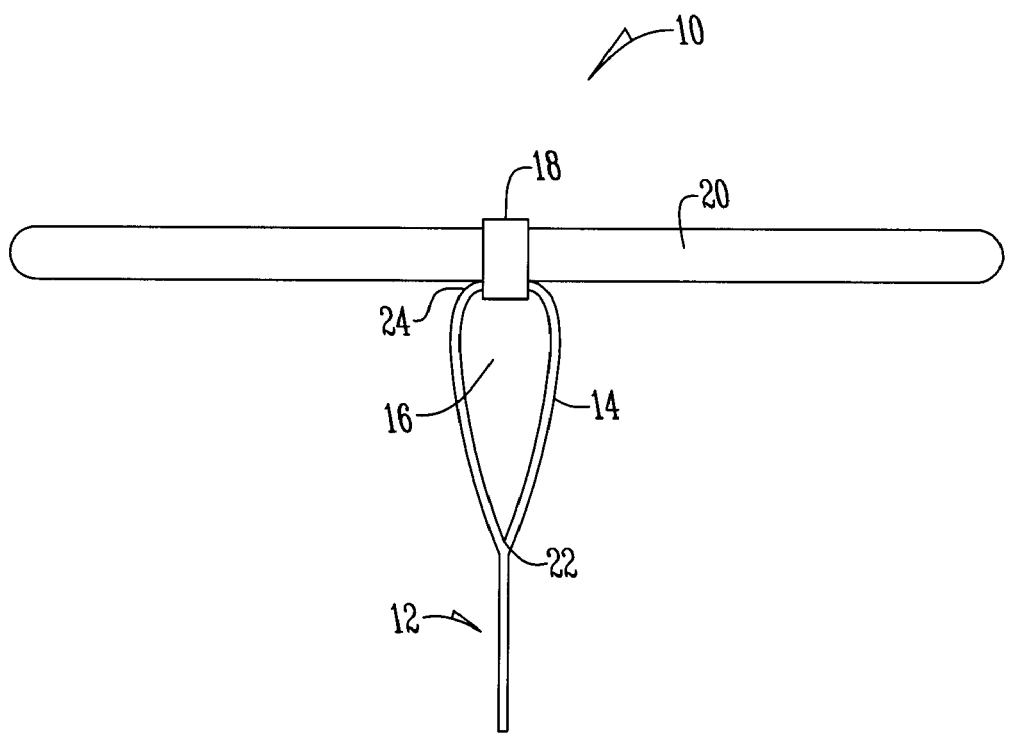
FIG. 3 is a side view of a blocking device attached to a vehicle visor.

Referring to the Figures the sunblocking device 10 has an elongated member 12 having a portion 14 that is folded back toward the elongated member 12 and attached to the elongated member 12 to form an elongated opening 16. Extending through the elongated opening 16 is a strap 18 having two free ends that are attached to one another. Preferably, the strap is made of an elastic material.

In operation, the sunblocking device is attached to a vehicle visor 20 by fitting the strap 18 around the visor 20 lengthwise. The visor preferably lies in a generally horizontal plane. When not in use the strap 18 is slid within the elongated opening 16 toward the attached end 22 of the folded portion 14 which permits and retains the device 10 in a horizontal position parallel to that of the visor 20.

When the device 10 is needed to block the sun the device 10 is moved such that the strap 18 moves toward the crease 24 of the folded portion 14 within the elongated opening 16 which permits the device 10 to hang generally perpendicular or transverse to the visor. In this position, the device is slid lengthwise along the visor 20 and the strap 18 to position the device in the optimum spot to block the sun while increasing a driver's field of vision.

What is claimed is:

1. A sunblocking device, comprising:
   an elongated member having a portion folded back and attached to the elongated member at an attached end to form an elongated opening;
   a strap that extends lengthwise around a vehicle visor and is slidably received within the elongated opening such that the strap is slid within the elongated opening toward the attached end when not in use to retain the device in a horizontal position parallel to the visor; and
   wherein the portion folded back has a crease within the elongated opening such that movement of the strap toward and over the crease within the elongated opening permits the device to hang perpendicular to the visor.

2. The device of claim 1 wherein the strap is of an elastic material.

3. The device of claim 1 wherein the strap has two free ends.

4. The device of claim 1 wherein the device is attached to the vehicle visor having a width and a length wherein the length is longer than the width such that the strap extends lengthwise around the vehicle visor.

5. The device of claim 1 wherein the device is attached to the vehicle visor having a width and a length wherein the length is longer than the width such that the elongated member extends transversely to the length of the vehicle visor.

6. The device of claim 1 wherein the elongated member is formed of a single piece of material.

7. The device of claim 1 wherein the device is attached to the vehicle visor having a width and a length wherein the length is longer than the width.

8. The device of claim 5 wherein when the device is in use the device is slid lengthwise along the visor and the strap to position the device in the optimum spot to block the sun while increasing a driver's field of vision.

* * * * *